United States Patent [19]

Vogt et al.

[11] Patent Number: 5,771,102
[45] Date of Patent: Jun. 23, 1998

[54] PROCESS FOR THE TRANSMISSION OF IMAGES

[75] Inventors: Wilhelm Vogt, Lichtenau; Dirk Lappe, Dinkler; Rodolfo Mann Pelz; Oliver Vogt, both of Hanover; Gunnar Nitsche, Hildesheim; Frieder Mundt, Neumuenster, all of Germany

[73] Assignee: Robert Bosch GmbH, Stuttgart, Germany

[21] Appl. No.: 553,467

[22] PCT Filed: Mar. 8, 1995

[86] PCT No.: PCT/DE95/00320

§ 371 Date: Dec. 22, 1995

§ 102(e) Date: Dec. 22, 1995

[87] PCT Pub. No.: WO95/24770

PCT Pub. Date: Sep. 14, 1995

[30] Foreign Application Priority Data

Mar. 11, 1994 [DE] Germany .......................... 44 08 163.4

[51] Int. Cl.⁶ ........................ H04N 1/415; H03M 13/02
[52] U.S. Cl. ........................ 358/433; 358/426; 358/261.1; 341/52
[58] Field of Search .................................. 358/433, 426, 358/432, 261.4, 467, 261.1, 261.2, 431, 405, 412; 341/50, 52, 55, 56, 59, 67, 123; 371/37.1, 47.1; 348/384, 385, 405, 398, 392; H04N 1/415

[56] References Cited

U.S. PATENT DOCUMENTS

| | | | |
|---|---|---|---|
| 4,188,616 | 2/1980 | Kazami et al. ...................... | 340/146.1 |
| 4,275,457 | 6/1981 | Leighou et al. ........................ | 364/900 |
| 4,635,262 | 1/1987 | Kittel ........................................ | 371/42 |
| 4,692,816 | 9/1987 | Sugiyama et al. ...................... | 358/342 |
| 5,321,521 | 6/1994 | Nomizu .................................... | 358/426 |
| 5,335,016 | 8/1994 | Nakagawa .............................. | 348/405 |
| 5,502,571 | 3/1996 | Decotignie .............................. | 358/335 |
| 5,602,875 | 2/1997 | Mantel et al. ........................... | 375/264 |
| 5,603,096 | 2/1997 | Gilhousen ................................ | 455/69 |
| 5,623,511 | 4/1997 | Bar-David et al. ..................... | 375/207 |

OTHER PUBLICATIONS

Bosch Technische Berichte, No. 54, 1991, "Uebertragung von Bewegt–und Standbildern . . . ", Dietmar BIERE (No Translation).

*Primary Examiner*—Kim Yen Vu
*Assistant Examiner*—Madeleine Av Nguyen
*Attorney, Agent, or Firm*—Michael J. Striker

[57] ABSTRACT

The process for transmission of images enables various classes of source-coded image data to be channel-coded and transmitted at various class code rates. For this purpose, source-coded image data to be transmitted are divided into classes of different sensitivity with respect to transmission errors and the classes are provided with different error protection and are channel-coded for transmission. Information words are provided at the beginning of each class containing information regarding the class type, code rate, number of data bits belonging to a particular class and regarding the error protection employed. In addition, a synchronizing word is added to the image data for each image. In the receiver the first information words are channel-decoded according to a fixed code rate and the information stored in the first information words including code rate is used for the channel-decoding of the received coded image data. The image data are subsequently subjected to an image source decoding and read out.

34 Claims, 7 Drawing Sheets

FIG. 6

| | K |
|---|---|
| MV | 1 |
| DCT | 2 |
| QU | 3 |
| P | 4 |

| | C |
|---|---|
| H | 0000 |
| MV | 0001 |
| B | 0010 |
| L | 0011 |
| H.261 | 0100 |
| | 0101 |
| | 0110 |
| | 0111 |
| | ⋮ |
| | 1111 |

21

...

PROCESS FOR THE TRANSMISSION OF IMAGES

BACKGROUND OF THE INVENTION

The invention is directed to a process for the transmission of images in which data are generated by at least one data source, are inserted in a data frame at a channel coder and are subjected to a channel coding. A process for the transmission of images is described in Biere, "Übertragung von Bewegt- und Standbildern in stark gestörten schmalbandigen Kanälen beim Funkbildtelefon [Transmission of moving images and still images in narrow-band fax telephone channels with high interference]", Bosch Technische Berichte, No. 54, 1991, in which the image data of an image undergo a source coding and the source-coded image data are then channel-coded and transmitted via a data channel. The source coding is effected in the form of a predictive error coding and a block-oriented movement estimation. A rate-compatible punctured convolutional code (RCPC) is used for channel coding, the occurring data streams being punctured and subsequently interleaved to form a common data stream.

SUMMARY OF THE INVENTION

The process according to the invention enables various kinds of data to be channel-coded and transmitted at various code rates. Information about the code rate and the class type is advantageously stored in an information word. This enables an efficient dividing up of the available data rates.

In a particularly advantageous manner, information about the type of data generation is transmitted itself as data of a class. In particular, image data, audio data, facsimile data, and data in the form of data files are transmitted. The channel error protection is improved by using an interleaving method. By forming a data frame with multiple whole-number storage locations to be found in a diagonal of a memory matrix, it is possible to find the synchronizing word quickly by means of the data interleaving method and to carry out an accurate synchronization of the deinterleaver and data frame.

Instead of code information, additional data is advantageously entered in the information word. Accordingly, data can be exchanged from the channel coder to the channel decoder without having to change the data protocol. A Viterbi decoder which operates according to the Maximum Sequence Estimation process is particularly suitable for channel decoding.

The process according to the invention for transmitting image data has the advantage over the prior art that the source-coded data are divided into classes, these classes indicating, e.g., the sensitivity of the source-coded image data to transmission errors and are coded with different code rates according to the extent of the error protection. These classes are provided with varying degrees of error protection depending on sensitivity, the sensitive image data receiving greater error protection than the less sensitive image data. In this way, the available data rate is used more efficiently. Accordingly, it is possible to improve image quality at the same data rate. The division of the image data into classes and the length of the classes and error protection used are transmitted by way of a first information word so that these data which are required for decoding are transmitted also and made available to the decoder. Data relating to the source coding are preferably included in the transmission in the form of code words. A second information word is used to identify the length of the code words, the class of the code words, and the error protection of the code words. In this way, additional information is made available for the source decoding. The quality of the source-decoded image data is accordingly improved.

Further embodiments of the preferred process provide additional improvements over the prior art. In a particularly advantageous manner, a synchronizing word composed of two Williard code words or two Barker code words is used for synchronization. The synchronizing word is added to the image data in a fixed pattern as a pseudo-noise (PN) synchronizing word. This enables a simple and accurate synchronization with sufficient protection against transmission errors.

The information word or the first and second information word for each class advantageously includes class number, a code number, and a length number. The class number provides the class of the associated code words or the class of the associated image data. The code number contains the code rate used for the channel coding and the length number provides the quantity of bits associated with the code words or class.

Since the first and second information words are terminated by a predetermined number of zero bits, the Viterbi decoder is in a known state. The information word or the first and second information word can be evaluated subsequently without having to evaluate additional data bits by inserting data bits which do not change the state of the Viterbi decoder. Subsequently, the following code words or the following image data are decoded using the data contained in the information word or in the first and second information words.

The code words preferable comprise a first and second code word, the first code word having a length of three bits where the first bit of the code word indicates whether the image data are formed quickly or slowly when the image is reproduced. The second bit of the first code word indicates which of two possible source coding methods was used. The third bit of the first code word indicates whether an information word or a first and second information word is used. The second code word preferably has a length of five bits and contains the step value of the quantization used in the source coding.

It is advantageous to use a third and a fourth code word, where the third code word has a length of one bit and indicates whether or not additional information relating to the type of source coding is stored in the following fourth code word which has a length of eight bits. In this way, it is possible to transmit additional information concerning the source coding by means of the third and fourth code words and to use it for image source decoding.

The source-coded image data concerning contour, movement vector, block position, DCT coefficient, quantizing step, and structure index are preferably divided into different classes. This ensures an efficient transmission of image data and enables an improved image quality at the same data rate.

The flexibility of the described process is increased in that the code number has unoccupied codes so that codes will be available for future classes. In this way, it is possible to use the data protocol to process new classes in future image processing methods having new classes without changing the data protocol. The described process is accordingly well suited for further developments.

The process is improved in that the length index or length pointer is used not only to indicate the amount of image data bits contained in a class, but also as an indicator for the decoder to indicate whether all of the image data bits of a class are contained in this class or whether another class with an additional first information word will follow. This increases the processing speed of the decoder.

An advantageous construction of the interleave consists in the use of a convolutional interleave having a memory matrix with a fixed width and an infinite length. The data bits are read in diagonally from top left to bottom right and the successive diagonals are offset horizontally relative to one another by one storage location. For the purpose of transmitting image data, the image data bits are read out of the memory matrix from successive lines in the sequence by which the diagonals were offset relative to one another when read in. This enables a simple and fast interleaving process which offers good protection against burst errors in the data channel.

It is particularly advantageous to fix the amount of data bits to be transmitted for an image at a multiple of the bits which can be read into a diagonal in the matrix, the missing image data bits being replaced by empty bits. In this way, it is possible for the image data bits to be read into the matrix memory of the deinterleaver in such a way that the data bits of the synchronizing word occupy a determined column and are accordingly in a predetermined grid in the second memory matrix of the deinterleaver. The synchronizing word is found with the help of a correlating process. It is accordingly possible to synchronize all system components of the receiver with one synchronizing word.

In a preferred imbodiment of the method of the invention a first information word is dec according to a fixed structure, with a fixed bit length and a fixed code rate. The following image data bits are subsequently channel decoded corresponding to the information stored in the first information word. This enables a fast and efficient channel decoding.

A second information word is preferably channel-decoded with a fixed structure, a fixed bit length and a fixed channel coding and information concerning the type of class of the following code words, the type of error protection, i.e., the code rate, and the amount of data bits belonging to the code words is determined from the second information word in order subsequently to channel-decode the code words following the second information word using the data stored in the second information word and to use the information of the code word for subsequent image source decoding of the image data bits.

A convolutional deinterleaver having a memory matrix is advantageously used to implement the eeinterleaving process. The received data are read in diagonally from the bottom left-hand side to the top right-hand side, successive diagonals are offset relative to one another by one storage location in the vertical direction, and the data are read out line by line subsequently. The lines are offset relative to one another by one storage location and in the same direction as the diagonals in which the data are read in. In this way, it is possible to carry out a fast and simple deinterleaving process which simultaneously provides the data to be transmitted with adequate protection against burst errors in the data channel.

In a particularly advantageous manner, a Viterbi decoder, i.e., a maximum likelihood symbol estimation decoder, based on the Viterbi algorithm is used for channel decoding. The Viterbi decoder has a fixed memory depth. After the information word or the first or second information word is decoded, the Viterbi decoder is in a known state and the information word or the first or second information word can be evaluated by a quantity of entered zero bits or one bits.

The data following the information word or following the first or second information word are then channel-decoded by the Viterbi decoder with the information contained in the information word or in the first or second information word. This enables an efficient transmission process in which data transmission and channel decoding are adapted to one another with respect to time so that the data of the first and second information word are determined before the image data are channel decoded.

BRIEF DESCRIPTION OF THE DRAWING

The objects, features and advantages of the invention will now be illustrated in more detail with the aid of the following description of the preferred embodiments, with reference to the accompanying figures in which:

FIG. 6 is a table showing the classification of source-coded image data in relation to code rate for channel coding;

FIG. 7 is a table showing a code pointer for the first or second information word;

DESCRIPTION OF THE PREFERRED EMBODIMENTS

Description of the Embodiment Example

Figure 1:
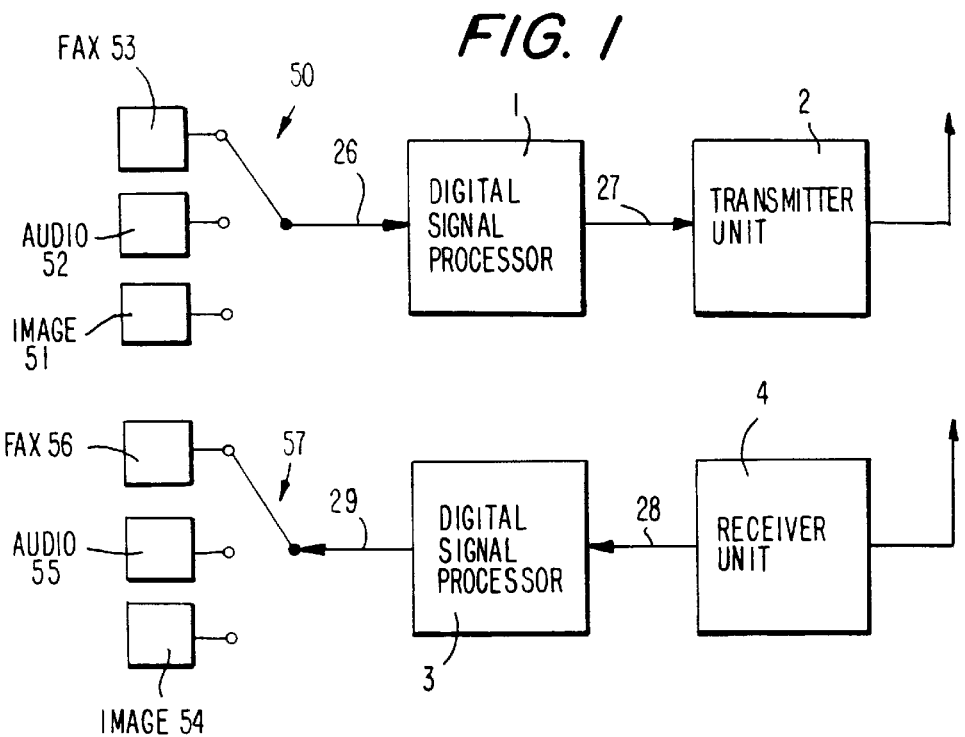
FIG. 1 is a block diagram of apparatus for processing, transmitting and receiving image data used to perform the process according to the invention.

FIG. 1 shows a digital signal processor 1 which is connected with a multiplexer 50 via a data bus 26. The multiplexer 50 is connected with an image data source 51 (image), an audio source 52 (audio), and a telephone facsimile 53 (fax). The data sources feed digital data to the first digital signal processor 1. The digital signal processor 1 is connected with a transmitter unit 2 via a transmission line 27.

FIG. 1 also shows a receiver unit 4 which is connected via a reception line 28 with a second digital signal processor 3. The second digital signal processor 3 is connected with an image sink 54, an audio sink 55 and a facsimile sink 56 via a second data bus 29. The second digital processor 3 sends the received data to the appropriate data sinks.

Figure 2:
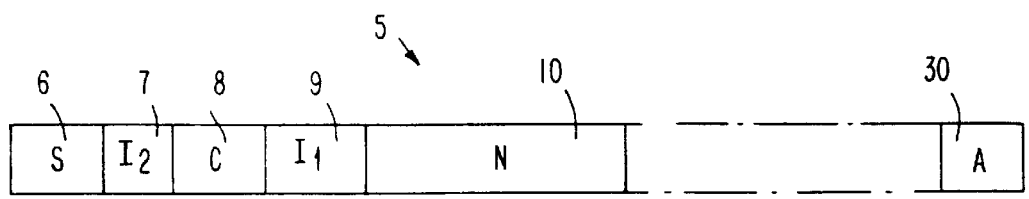
FIG. 2 is a diagram of a data frame of an image.

FIG. 2 shows a data frame 5 having a fixed quantity of data bits. The data frame 5 has a synchronizing word 6, a second information word 7, code words 8, a first information word 9, image data bits 10, and termination bits 30. A data frame contains, in each instance, the data required for transmission of an image. In general, the data frame 5 includes a plurality of first and second information words 7, 9, a plurality of code words 8 and a plurality of classes of image data bits 10. For the sake of simplicity, not all data are shown in FIG. 2. For the transmission of data according to the claim 1, the data frame is constructed in an appropriate manner, the information word being represented by the first or second information word. No distinction is made between the first and second information word in claim 1.

Figure 3:
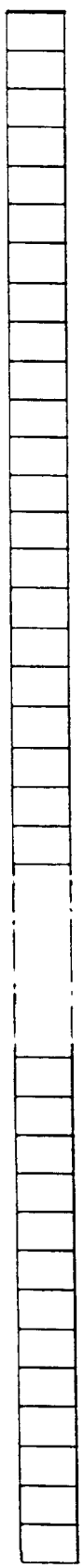
FIG. 3 is a diagram of a synchronizing word.

A synchronizing word 6 which has a length of forty bits and represents a pseudo-noise combination of two Williard words is shown schematically in FIG. 3. A pseudo-noise combination of two Barker words could also be selected. A combination of Williard words or Barker words is used because the known Williard words and Barker words only have a length of up to 33 bits, which amount is not always sufficient to enable an accurate synchronization with adequate error protection. The synchronizing word 6 is inserted in the data frame 5 according to a fixed pattern and a bit of a synchronizing word is always in the first position of the data frame.

Figure 4:
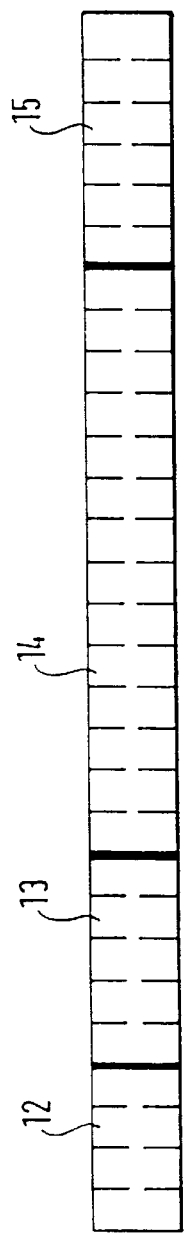
FIG. 4 is a diagram of an information word.

FIG. 4 shows a first or second information word 9, 7 since the first and second information words 9, 7 are formed identically. The first or second information word 9, 7 has a class number 12 with a length of four bits, a code pointer 13 with a length of five bits, a length number 14 with a length of fourteen bits, and six zero bits 15. The class number 12 indicates the class to which the following image data 10 belong. The code pointer 13 contains the information concerning the error protection with which the image data 10 are channel coded, i.e., the code rate of the channel-coded image data 10. The length number 14 indicates the quantity of image data bits 10 or the quantity of the data bits belonging to the code words 8.

The quantity of zero bits 15 which terminate each information word is adapted to the memory depth of the channel coder. Since the channel coder used has a memory depth of six bits, six zero bits 15 are used.

Figure 5:
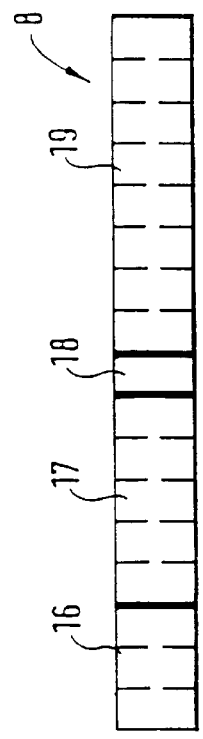
FIG. 5 is a diagram showing code words used in the process according to the invention.

FIG. 5 shows four code words 8, of which a first code word 16 has a length of three bits, a second code word 17 has a length of five bits, a third code word 18 has a length of one bit, and a fourth code word 19 has a length of eight bits. The first bit of the first code word 16 indicates whether the image data are produced quickly or slowly when the image is reproduced. The second bit of the first code word 16 indicates which of two possible source coding methods was applied. The third bit of the first code word 16 indicates whether or not information words are used.

The second code word 17 indicates the step value of the quantization used in the image source coding. The third code word 18 indicates whether additional information concerning the image source coding which is only to be used in future developments is stored in the following fourth code word 19.

The code words 8 are used to transmit information concerning the image source coding with the image data and to use this information in the image source coding.

FIG. 6 shows the classification of the source-coded image data with the corresponding code rates used for channel coding. The first class is allocated to the movement vectors MV. The second class is allocated to the DCT coefficients (DCT). The third class is allocated to the quantization (QU). The fifth class is occupied by the position data (P) of the macroblocks.

FIG. 7 shows a table for the code pointer 13 of the first or second information word 9, 7. Under H, information concerning the total image is represented by the code 0000, the movement vectors MV are represented by the code 0001, the macroblocks B are represented by code 0010, empty bits L are represented by code 0011, and the H0.261 process is represented by code 0100. Also shown in FIG. 7 are unoccupied codes which can be used for future classes.

Figure 8:
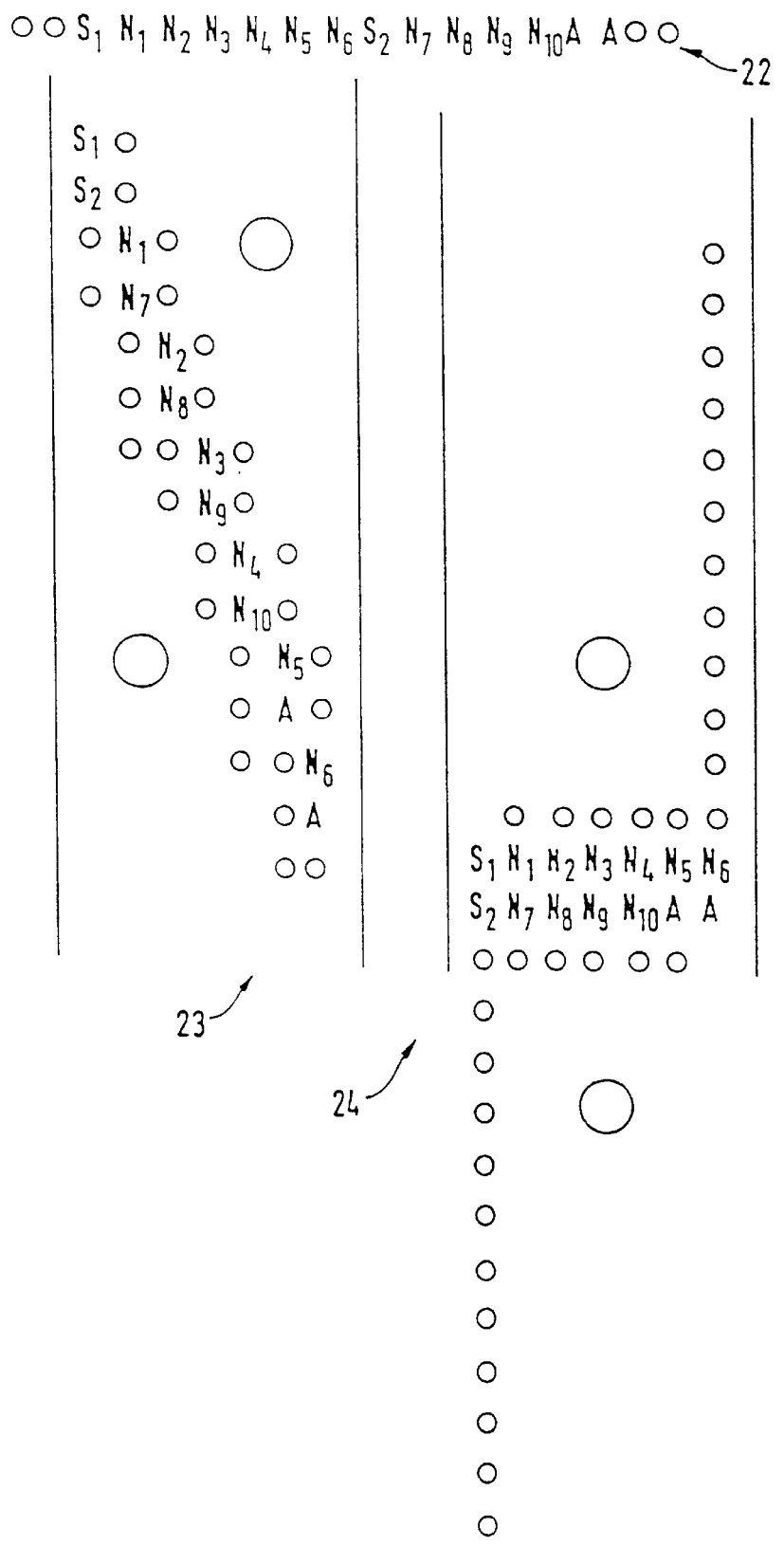
FIG. 8 shows a convolutional interleave memory matrix and convolutional deinterleaver memory matrix.

FIG. 8 shows a data stream 22 formed by a sequence of synchronizing bits $S_f$, user bits $N_f$, and termination bits 30. The data stream represents part of a data frame. The user bits are represented, e.g., by the first or second information word 9, 7, the code words 8 or the image data bits 10. Further, a first memory matrix 23 of an interleave is shown. The data stream 22 is read into the first memory matrix 23 of the interleave in the form of diagonals from top left to bottom right. The data bit stream 22 shows the data bits necessary for transmitting an image. The quantity of termination bits A is so selected that entire diagonals are filled up with the data of an image when the data bits are read into the first memory matrix 23 of the interleave. The data bits of the first memory matrix 23 are read out again line by line from top to bottom and are transmitted to a receiver unit 3 via a data channel by a transmitter unit 2. The receiver unit 3 transmits the obtained data to the second signal processor 3 which reads the received data stream into a second memory matrix 24 of a deinterleaver corresponding to FIG. 8. FIG. 8 shows a second memory matrix 24 of a deinterleaver into which the data of the first memory matrix 23 of the interleave are written in diagonals from bottom left to top right. The data of the second memory matrix 24 are read out line by line from top to bottom so that the original data signal 22 occurs again and the data bits are again made available in the correct time sequence.

Figure 9:
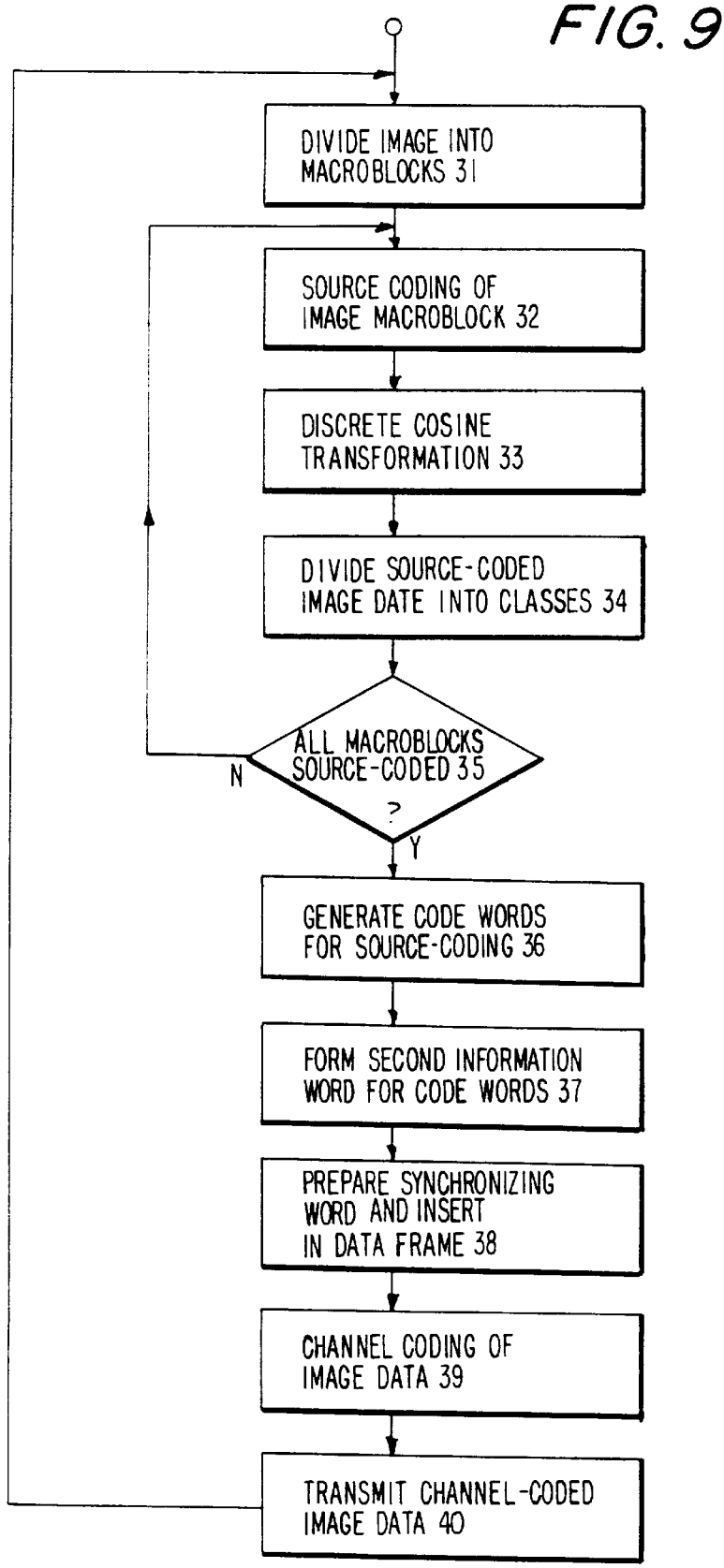
FIG. 9 is a flow chart for a process of transmitting images according to the invention.

The program flow of the process for the transmission of images is shown schematically in FIG. 9. The image is divided into macroblocks at program point 31. The image is in CIF or QCIF format, for instance. The CIF format has 352 pixels in a line and 288 lines. The QCIF format has 176 pixels in a line and 144 lines. An image is divided into 99 macroblocks, each macroblock having four luminance blocks and two chrominance blocks. Each of the four luminance blocks and two chrominance blocks has 64 pixels (eight times eight).

The image data of the first macroblock which is arranged at the upper left side of the image are subjected to a source coding at program point 32. In so doing, the macroblocks are subjected to a block-by-block movement estimation, the movement vectors MV being determined in relation to a precursor image. The movement vectors MV are transmitted to the chrominance blocks in an analogous manner. A discrete cosine transform is carried out at program point 33 either intra-mode, i.e., a discrete cosine transform of the macroblock is effected in the original block, or inter-mode, where a discrete cosine transform is effected in the difference between the original image and a predicted image. A discrete cosine transform is carried out in a two dimensional manner on the luminance blocks and chrominance blocks with a value of eight times eight pixels and DCT spectral coefficients are obtained in this way. The DCT spectral coefficients are quantized and subjected to a zigzag run length coding. The discrete cosine transform is carried out as an intra-mode discrete cosine transform as was described above. Another process consists in carrying out an inter-mode discrete cosine transform.

Suitable source coding methods are known and are described, for instance, in PTT Research Neher Laboratories The Netherlands, "Description Reference Model 8" (RM8), Paris, 1989.

The contour, movement vectors MV, position of the luminance and chrominance blocks, DCT spectral coefficients, and the step value of the quantization of the spectral coefficients are accordingly available as source-coded image data which must be transmitted. Additional source coded image data comprise information on the quantization step of the differential quantization (DQUANT), for example. For this purpose, a word with a length of two bits indicates the change in quantization. Other information specifies the luminance blocks which are contained in a macroblock and which contain coded transform coefficients (CBPY). In addition, information specifying the chrominance blocks of a macroblock which contain coded transform coefficients, the prediction mode used for the image or the macroblock, and the quantization used for the transform coefficients (CBPCM) is transmitted. In addition, a code word (COD) indicates whether or not coding is carried out.

These source-coded image data shown in FIG. 6 are divided into classes. The classes are determined according to the sensitivity of the source-coded image data in relation to transmission errors. Code rates are allocated to the classes but not directly linked with the classes. Identical classes can also have different code rates. Image data which must be provided with special protection against transmission errors are assigned a low code rate. FIG. 6 shows an allocation of source-coded image data to corresponding classes and code rates. The classes are intended as information on the data sinks or image source coders.

After the source-coded image data are divided into a plurality of classes, the first information word 9 for the classes to be transmitted is established at program point 34. The class number 12 in FIG. 4 indicates class 1. If 24 data bits belong to class 1, the length pointer 14 indicates the number 24 in the form of a binary number as is shown in FIG. 4. The quantity of zero bits 15 is fixed at six zero bits in all first and second information words. If the quantity of data bits needed for transmitting the source-coded image data of a class exceeds the number $2^{14}-1$, the length pointer receives the value $2^{14}-1$ and another first information word is formed which is followed by the missing source-coded image data of the preceding class. The decoder accordingly knows that a length pointer having the value $2^{14}-1$ is followed by an addition to the preceding class. An analogous procedure is followed for the following classes of the source-coded macroblock and a first information word 9 is prepared in each instance.

An inquiry is then made at program point 35 as to whether or not all macroblocks of the image to be processed have been source-coded. If this is not the case, the program skips back to program point 32 and the following macroblock is source-coded. The macroblocks are successively source-coded line by line from top left to bottom right. However, if all macroblocks of the current image are surce-coded, the program jumps to program point 36.

At program point 36, the code words 8 containing the information on the image source coding are prepared. If an image is produced quickly, the first bit of the first code word 16 is a zero. A first source coding process was used during the actual image source coding so that the second bit of the first code word 16 is likewise zero. The third bit of the first code word 16 has a one, since information words are used. The second code word 17 indicates the step value of quantization so that the second code word 17 is to be formed as a corresponding binary number. The third code word 18 is occupied by a zero, since no additional information on the source coding process is stored in the fourth code word 19. The fourth code word is subsequently occupied by eight zeros. FIG. 5 shows the code words 8 which have just been described.

A second information word 7 which is structured in a manner corresponding to the first information word 9 and is used to identify code words 8 is then formed at program point 37. The second information word 7 gives the class, the code rate, and the quantity of data bits of the code words 8 and contains six terminating zero bits 15. As in the case of the first information word, this is indicated by a class number 12, a code pointer 13, and a length number 14. The digital signal processor 1 then prepares a synchronizing word with a length of forty bits at program point 38 as is shown in FIG. 3 and inserts the synchronizing word 6 in the data frame according to the channel coding corresponding to a predetermined pattern. Combinations of known Williard words and known Barker words are used for this purpose.

The digital signal processor 1 produces a data frame from the data, this data frame including a synchronizing word 6, a second information word 7, code words 8, a first information word 9 for the first class 1, and corresponding first information words and source-coded image data for the additional classes of the source-coded image, and a fixed quantity of termination bits 30. The quantity of data bits belonging to an image is fixed at a multiple of a predetermined quantity by means of the termination bits 30. The predetermined quantity is determined by the amount of image data which can be written into the memory matrix of the interleave in a diagonal so that the image data of an image fill up an entire quantity of diagonals in the memory matrix of the interleave.

At program point 39, the digital signal processor 1 carries out a channel coding of the image data needed to transmit an image. The second and first information words are channel-coded with the highest degree of error protection. The code words 8 are channel-coded with the error protection stored in the second information word in the code pointer. The source-coded image data are channel-coded with the error protection which corresponds to their class and is stored in the code pointer 13 in the first information words 9. A convolutional coding is preferably used for channel coding.

Convolutional coding is known and described in detail in Clark, "Error Correction Coding for Digital Communications", Plenum Press, New York, 1981, ISBN 0-306-40615-2, 227 ff. Additional coding procedures are described on pages 267 ff.

The channel-coded data of an image are then sent to the transmitter unit 2 at program point 40 and the transmitter unit 2 transmits the channel-coded image data by frequency modulation or GSFKI modulation. After program point 40, the program jumps back to program point 31 and the next image is processed. If delays occur in the channel coding so that there is no image data available for transmission when data must be transmitted, a zero bit is added and transmitted by the first digital signal processor 2.

If it is desired to install protection against burst errors in the data channel, an interleave is used in the channel coding described above. For this purpose, the digital signal processor 1 feeds the data stream shown in FIG. 8 to a first memory matrix 23 of an interleave at program point 39. The data stream 22 is read in from top left to bottom right in diagonals and the diagonals are offset relative to one another in a downward direction by one storage field. The digital signal processor 1 then reads the data bits line by line from the first memory matrix 23 and sends main to the transmitter unit 2.

Instead of dividing the source-coded image data of the macroblock into a plurality of classes as was described with reference to FIG. 9, it may be advantageous to divide the source-coded image data of an individual macroblock or several macroblocks into a class and to provide every class with a first information word. This reduces the coding delay, although an accurately graduated division into classes is not effected and in certain cases the data rate is accordingly not utilized as efficiently.

Figure 10:
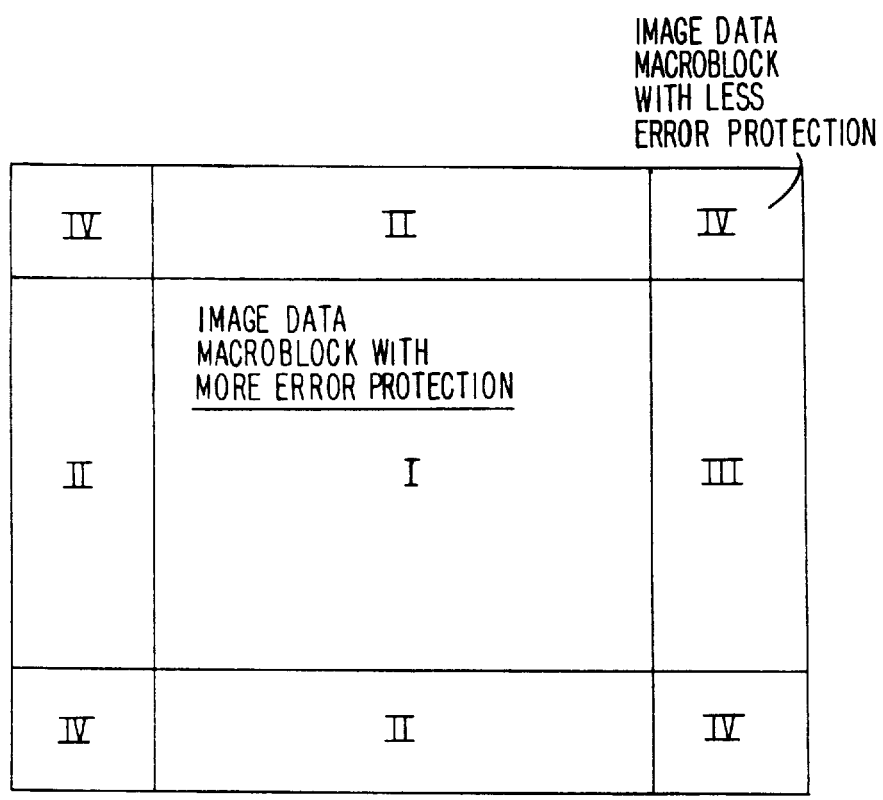
FIG. 10 is a diagram of an image divided into different regions designated by numbers according to the different classes of error protection performed in the method according to the invention.

FIG. 10 shows a division of an image into regions of different classes designated by numbers. Those classes with a small number correspond to a high degree of error protection. The macroblocks which are arranged in the peripheral regions are transmitted with a lower degree of error protection since these regions of the image play a subordinate part in the subjective perception of the image quality. However, the central regions of the image are associated with the classes having a high degree of error protection, since poor image quality is immediately apparent in these regions.

The process shown in FIG. 9 is especially simplified in that the source-coded image data of an image are divided into classes and these classes are provided with a first information word in each instance. In this way, the image data are combined in larger classes, which results in a particularly simple but less accurate process.

Figure 11:
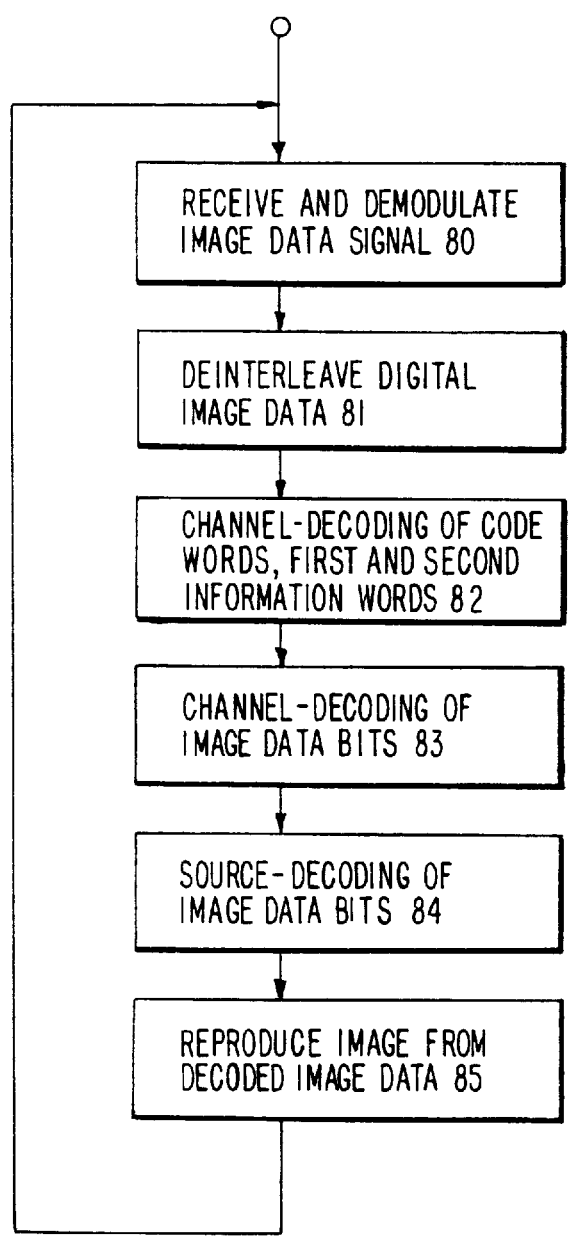
FIG. 11 is a flow chart for a process of receiving and decoding channel-coded and source-coded image data according to the invention.

The program flow for receiving, and decoding channel-coded and source-coded image data is shown schematically in FIG. 11. At program point 80, the image data are received by a receiver unit 4, frequency-demodulated and fed to the second digital signal processor 3. The second digital signal processor 3 subjects the digital image data to a convolutional deinterleaving process at program point 81 as is shown in FIG. 8 Interleaving and deinterleaving processes are known and described, among others, eg., in Clark, "Error Correction Coding for Digital Communications", Plenum Press, New York, 1981, ISBN 0-306-40615-2, 345 ff.

The digital image data are read into a first memory matrix 24 in diagonals from bottom left to top right. The second digital signal processor 3 knows that the bits of the synchronizing word are to be found in a determined column of the second memory matrix 24 at fixed intervals, i.e., in a spread. The time spread of the bits of the synchronizing word reduces the susceptibility of the synchronization to burst errors in the data channel. The second digital signal processor 3 determines the synchronizing word via a cross correlation comparison with an ideal synchronizing bit sequence and decides on the basis of an error threshold whether or not the synchronizing word was detected. Cross correlation procedures are known and described, e.g., in Proakis, "Digital Communications", McGraw-Hill, New York, 1989, 141 ff The time delay occurring in the deinterleaver is used by the second digital signal processor 3 to carry out synchronization. The first bit of the synchronizing word indicates the start of a data frame for the data of all entire image. The image data are then read out of the second matrix memory 24 line by line starting with the first bit of the synchronizing word. The second digital processor 3 knows that a first or second information word 9, 7 follows the first bit of the synchronizing word and the first or second information word 9, 7 has a predetermined number of data bits and is coded within a predetermined code rate. The second digital signal processor 3 carries Out a channel decoding based on the Viterbi algorithm (maximum likelihood sequence estimation) of the first or second information word 9, 7 and determines from the data stored in the first or second information word the quantity of data bits contained in the following code words and image data and the code rates at which the code words or image data bits are to be channel-decoded.

The maximum likelihood sequence estimation process is known and described in Clark, "Error Correction Coding for Digital Communications", Plenum Press, New York, 1981, ISBN 0-306-40615-2, 231 ff., and in Proakis, "Digital Communications", McGraw-Hill, New York, 1989, 394 ff.

At program point 82, the second digital signal processor 3 carries out a channel decoding of the code words 8 based on the Viterbi algorithm. The data stored in the code words 8 are stored by the second digital signal processor 3. The first information word 9 is then channel-decoded corresponding to the fixed code rate by the second digital signal processor 3 based on the Viterbi algorithm. From the data stored in the first information word 9, the second digital signal processor 3 learns how many data bits are contained in the following image data and the code rate at which the following bit data were channel-coded. The second digital signal processor 3 then carries out a channel decoding at program point 83, based on the Viterbi algorithm, of the following, image data bits using, the code rate stored in the first information word 9. Another first information word and additional image data bits are then channel-decoded by the second digital signal processor 3 based on the Viterbi algorithm until all of the image data bits belonging, to an image have been channel-decoded.

At program point 84, the image data bits of an image are subjected to an image source decoding by the second digital signal processor 3 and the channel-decoded and source-decoded image data are then sent to a second data bus 29 by the second digital signal processor 3. Corresponding image source decoding processes are given in an analogous manner by the source-coded image data.

During the image source decoding, the information stored in the code words 8 is used by the second digital signal processor 3. In particularly simple processes, no code words 8 are used so that the second signal processor 3 determines the source-decoded image data, and accordingly the image, from the first information words 9 and the source-coded image data 10.

The source decoded image data are then fed via the second data bus 29 to an image reproduction unit which presents the image at program point 85, whereupon the data of another image is processed by the second digital signal processor 3.

Further, it is not necessary to carry out a deinterleaving process on the reception side in technically simple processes with low image quality in which no interleaving process has been used on the transmission side.

The described processes are used for the transmission of images in mobile telephone communications, for instance. The European digital cordless telephone network (DECT), for example, serves as a transmission channel.

We claim:

1. A process for transmission of data comprising the steps of:
   a) generating said data by at least one data source;
   b) inserting said data in a data frame at a channel coder;
   c) dividing said data into a plurality of classes of variable length;
   d) preparing an information word of fixed length for each of said classes, said information word containing information regarding class type, number of data bits therein and class code rate, wherein said number of said data bits and said class code rate can be different for different ones of said classes;
   e) channel-coding said data for each of said classes by first reading said information word with said channel coder to obtain said class code rate and then channel-coding at said class code rate obtained from the reading to obtain channel-coded data; and f) channel-coding said information word for each of said classes at a fixed code rate to obtain a channel-coded information word for each of said classes.

2. The process according to claim 1, further comprising storing information regarding data generation and/or data source coding as data of a class in the data frame.

3. The process according to claim 1, wherein each of said classes contains image data, audio data, facsimile data and/or data files.

4. The process according to claim 1, further comprising subjecting the channel-coded data of each of said classes to an interleaving after said channel-coding, wherein during the interleaving the channel-coded data are read into diagonal positions in a first memory matrix and subsequently read out line by line from the first memory matrix.

5. The process according to claim 4, wherein the data frame contains a fixed n umber of said data bits corresponding to storage locations for a whole-number quantity o f said diagonal positions in the first memory matrix.

6. The process according to claim 1, further comprising synchronizing the transmission of said channel-coded data by a pseudo-noise sequence with autocorrelation characteristics.

7. The process according to claim 6, wherein said synchronizing is performed by a synchronizing method including forming a synchronizing word consisting of a pseudo-noise word composed of two Williard code words or two Barker code words.

8. The process according to claim 1, further comprising channel-decoding the respective information words at a fixed decoding rate to determine said class code rates and said numbers of data bits for the respective classes and subsequently channel-decoding said channel-coded data in the respective classes with the respective class code rates determined from said information words.

9. The process according to claim 8, wherein said channel decoding is performed by a Viterbi decoder operating by the maximum likelihood sequence estimation method.

10. The process according to claim 9, wherein said Viterbi decoder is in a known state after a last data bit of the channel-coded information word is read in for each of said classes, said channel-coded information word is evaluated by the Viterbi decoder without reading in additional data bits of the data frame, since bits are read into the Viterbi decoder which do not alter the state of the Viterbi decoder.

11. The process according to claim 1, wherein said information word for each of said classes is terminated by a fixed number of zero bits (15) or one bits, said channel coder has a memory depth and said fixed number corresponds to said memory depth.

12. A process for transmission of channel-coded source-coded image data over a data channel, said process comprising the steps of:

a) dividing the image into macroblocks;
b) source-coding each of said macroblocks to obtain source-coded image data;
c) dividing said source-coded image data for said macroblocks into respective pluralities of classes of said image data, said classes having respective different image reconstruction sensitivities to transmission errors;
d) providing each of said classes with a first information word (9) having a fixed structure and containing information regarding class type, channel-coding, class coding rate and an amount of image data present herein, wherein said amount of image data and said class code rate are variable among said classes;
e) adding a fixed number of code words (8) to said source-coded image data prior to channel coding, said code words (8) containing information regarding the type of said source coding;
f) providing a second information word (7) together with said code words (8), said second information word having a fixed pattern and containing information relating to code word type, channel-coding type and number of data bits in said code words (8);
g) channel-coding and transmitting for each of said classes said first information word (9) and said second information word (7) with a predetermined channel coding;
h) channel-coding and transmitting said code words (8) and said source-coded image data (10) of each of said classes with a class-determined channel coding at said class coding rate to form channel-coded source-coded image data; and
i) adding a synchronizing word to the channel-coded source-coded image data.

13. The process according to claim 12, wherein said synchronizing word consists of a pseudo-noise data word composed of two Williard code words or two Barker code words.

14. The process according to claims 12, wherein the macroblocks are transmitted sequentially one after the other.

15. The process according to claim 12, wherein the first and second information word (9,7) each have a class number (12) with a length of four bits, a code pointer (13) with a length of five bits, and a length number (14) with a length of fourteen bits, the class number (12) indicates the class of the associated data, the code pointer (13) indicates the code rate used for the channel-coding, and the length number (14) indicates the number of code word data bits or of class data bits.

16. The process according to claim 12, wherein first and second information word (9, 7) are each terminated by a fixed number of zero bits (15) or one bits and said fixed number corresponds to a memory depth of a channel coder used for the channel-coding.

17. The process according to claim 12, wherein the code words (8) comprise a first and a second code word (16, 17), the first code word (16) has a length of three bits and comprises a first bit, a second bit and a third bit and the first bit indicates image data formation speed, the second bit indicates whether or not one of two possible source coding methods was used for said source-coding, and the third bit indicates whether or not information words are present, and the second code word (17) has a length of five bits and indicates a step value for quantization used to determine DCT coefficients.

18. The process according to claim 17, wherein the code words (8) comprise a third and a fourth code word (18, 19), the third code word (18) has a length of one bit and indicates whether or not additional information about the source coding is stored in the fourth code word (19) which has a length of eight bits.

19. The process according to claim 12, wherein the source-coded image data comprises movement vectors (MV), macroblock positions (P), DCT coefficients (DCT), and quantizing step (QU); and further comprising arranging said movement vectors (MV), said macroblock positions (P), said DCT coefficients (DCT) and said quantizing step (QU) in respective different ones of said classes.

20. The process according to claim 19, wherein the movement vectors (MV), as one portion of said data, and the DCT coefficients (DCT), as another portion of said data, contain transform coefficients for variable two-dimensional length coding and two bits for identifying a macroblock end and other portions of said data contain information regarding differential quantization (DQUANT) and/or regarding luminance blocks contained in said macroblocks and coded transform coefficients (CBPY) and/or information regarding the luminance blocks of said macroblocks which contain coded transform coefficients, prediction modes used for the image or the macroblocks, and quantization methods employed (CBPCM) and/or information regarding whether or not coding is carried out (COD).

21. The process according to claim 15, wherein the code pointer (13) designates an unspecified code for future classes.

22. The process according to claim 21, wherein the unspecified code is a rate-compatible punctured convolutional code.

23. The process according to claim 15, wherein when said length number (14) indicates that a provided amount of image data (10) is greater than the designated number of said class data bits, the length number is then set to a value equal to $(2^{14}-1)$ and said class having said length number reset to said value is followed by another class for which said first information word (9) contains additional data from said class.

24. The process according to claim 12, further comprising feeding the channel-coded source-coded image data into a first memory matrix (23) in a convolutional interleave, and wherein the first memory matrix (23) has a fixed width and is rewritten cyclically by means of the convolutional interleave, the channel-coded source-coded image data are read in bit by bit in diagonal positions in the first memory matrix from the upper left side to the bottom right side and successive ones of the diagonal positions are offset horizontally by one storage location in each instance, and for the purpose of transmission said channel-coded source-coded image data are read out of successive lines of said first memory matrix bit by bit in the sequence in which the diagonal positions were offset relative to one another when read in.

25. The process according to claim 24, wherein a total number of said class data bits to be transmitted for an image correspond to a fixed quantity which corresponds to a multiple of the number of bits which can be read into a diagonal of the first memory matrix (23).

26. The process according to claim 12, wherein the first or second information words include coded information instead of said information regarding said code rate and further comprising decoding said coded information in said channel-decoding to indicate that said information word including said coded information should not be used and a subsequent one of said information words should be used for said channel-decoding.

27. The process according to claim 12, further comprising feeding the channel-coded source-coded image data to a channel decoder, achieving time synchronization from the synchronizing word (6) by correlation comparison, decoding the first information word (9) for each of said classes to obtain said information regarding the class type, the channel-coding, the class coding rate and the amount of image data present therein for each of said classes as well as error protection information; after decoding the first information words (9) channel-decoding the channel-coded source-coded image data associated with the respective first information words (9) using said information in the first information words (9) to obtain the source-coded image data; then source-decoding the source-coded image data to obtain decoded reproducible image data and subsequently reproducing the image from the decoded reproducible image data.

28. The process according to claim 27, wherein the second information word (7) has a fixed structure, a fixed bit length and a fixed channel coding, and further comprising decoding said second information words (7) to obtain for each of said classes said information regarding said code word type, said channel-coding type and said number of data bits in said code words as well as error protection information; after the decoding the respective second information words (7) channel-decoding said code words (8) belonging to the respective second information words (7) using the information stored therein and using the code words (8) for said source-decoding of each of said classes.

29. The process according to claim 27, further comprising feeding said channel-coded source-coded data into a second memory matrix (24) of a convolutional deinterleaver, said second memory matrix (24) of the deinterleaver having a predetermined width and being rewritten cyclically, so that said channel-coded source-coded data are read in bit by bit into diagonal positions from the bottom left side to the top right side of the second memory matrix and successive diagonal positions are offset relative to one another horizontally by one storage location, and reading said channel-coded source-coded data out of said second memory matrix bit by bit and line by line and feeding said channel-coded source-coded data so read out to the channel decoder in the sequence in which said data is read out.

30. The process according to claim 27, wherein said channel-decoding is performing with a Viterbi decoder used as a channel decoder, and the Viterbi decoder operates using the maximum likelihood sequence estimation method.

31. The process according to claim 30, wherein the Viterbi decoder has a memory with a fixed memory depth, and further comprising after detecting a zero bit in the first or second information word (9, 7) supplying said memory of the Viterbi decoder with zero bits from a digital serial processor (3) so that additional image data is not processed, and channel-decoding the first and/or second information word (9, 7) and data entities which follow the first or second information word (9, 7).

32. A process for transmitting image data derived from images, said process comprising the steps of:
   a) source-coding the image data of an image to obtain source-coded image data;
   b) dividing the source-coded image data of the image into a plurality of classes having respective different image reconstruction sensitivities to transmission errors due to transmitting the image data;
   c) adding a first information word (9) to each of said classes, said first information word (9) having a fixed pattern and containing information regarding class type, channel-coding, number of bits in the associated image data, sensitivity to transmission errors and class code rate, wherein said number of bits in the associated image data and said class code rate are variable for each of said classes and said class code rate;
   d) transmitting said first information word s (9) for said classes with fixed channel coding and said source-coded image data of said classes after a predetermined channel-coding at said class code rate to obtain channel-coded source-coded image data for the transmission; and e) adding a synchronizing word to the channel-coded source-coded image data and the first information words (9).

33. A process for sending and receiving image data for an image, said process comprising the steps of:

a) dividing the image into macroblocks;

b) source-coding each of said macroblocks to obtain source-coded image data;

c) dividing said source-coded image data of said macroblocks into respective pluralities of classes, said classes having respective different image reconstruction sensitivities to transmission errors;

d) providing each of said classes with a first information word (9) having a fixed structure and containing information regarding class type, channel-coding, class coding rate and an amount of image data present herein, wherein said amount of image data and said class code rate are variable for each of said classes;

e) adding a fixed number of code words (8) to said source-coded image data prior to channel coding, said code words (8) containing information regarding the type of said source coding;

f) providing a second information word (7) together with said code words (8), said second information word having a fixed pattern and containing information relating to code word type, channel-coding type and number of data bits in said code words (8);

g) channel-coding and transmitting said first information words (9) and said second information words (7) of said classes with a predetermined channel coding;

h) channel-coding and transmitting said code words (8) and said source-coded image data (10) of each of said classes with a class-determined channel coding at said class coding rate to form channel-coded source-coded image data;

i) adding a synchronizing word to the channel-coded source-coded image data;

j) receiving the channel-coded source-coded image data and feeding the channel-coded source-coded image data to a channel decoder;

k) time synchronizing using said synchronizing word (6) by correlation comparison;

l) decoding the respective first information words (9) for said classes to obtain said information regarding the class type, the channel-coding, the class coding rate and the amount of image data present therein for each of said classes as well as error protection information;

m) after said decoding of said first information words, channel-decoding the channel-coded source-coded image data associated with the respective first information words (9) using said information in the first information words (9) to obtain the source-coded image data; and n) then source-decoding the source-coded image data to obtain decoded reproducible image data.

34. A process for transmission of channel-coded source-coded image date over a data channel, said process comprising the steps of:

a) dividing the image into macroblocks;

b) source-coding each of said macroblocks to obtain source-coded image data;

c) dividing said source-coded image data of said macroblocks into respective pluralities of classes, said classes having respective different image reconstruction sensitivities to transmission errors;

d) providing each of said classes with a first information word (9) having a fixed structure and containing information regarding class type, channel-coding, class coding rate and an amount of image data present herein, wherein said amount of image data and said class code rate a re variable for each of said classes;

e) adding a fixed number of code words (8) to said source-coded image data prior to channel coding, said code words (8) containing information regarding the type of said source coding;

f) providing a second information word (7) together with said code words (8), said second information word having a fixed pattern and containing information relating to code word type, channel-coding type and number of data bits in said code words (8);

g) channel-coding and transmitting said first information words (9) and said second information words (7) for said classes with a predetermined channel coding;

h) channel-coding and transmitting said code words (8) and said source-coded image data (10) of each of said classes with a class-determined channel coding at said class coding rate to form channel-coded source-coded image data; and i) adding a synchronizing word to the channel-coded source-coded image data;

wherein the source-coded image data comprises movement vectors (MV), macroblock positions (P), DCT coefficients (DCT), and quantizing step (QU); and further comprising arranging said movement vectors (MV), said macroblock positions (P), said DCT coefficients (DCT) and said quantizing step (QU) in respective different ones of said classes.

* * * * *